United States Patent Office.

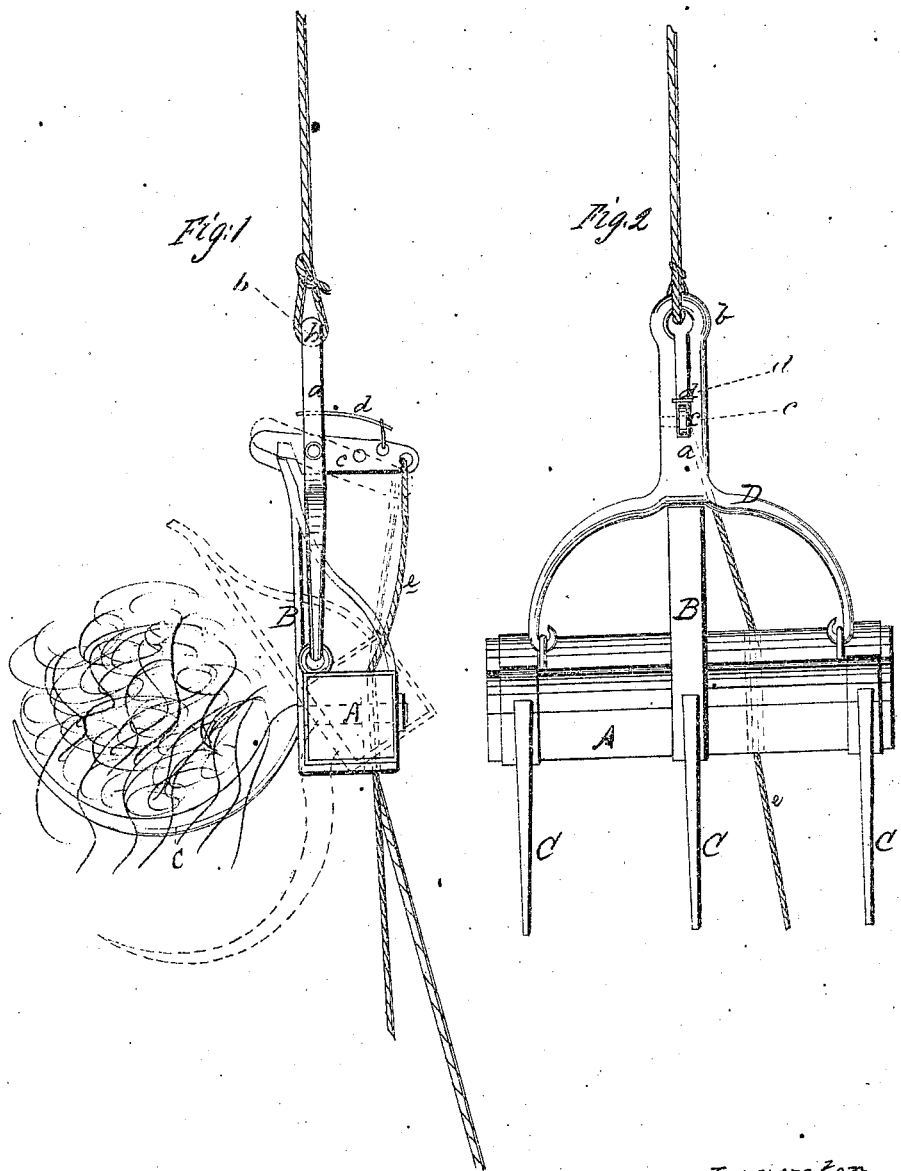
J. H. Wilder.
Horse Hay-Fork.
Nº 76573          Patented Apr. 7, 1868.

J. H. WILDER, OF FARMINGTON, OHIO.

Letters Patent No. 76,573, dated April 7, 1868.

IMPROVEMENT IN HORSE HAY-FORKS.

*The Schedule referred to in these Letters Patent and making part of the same.*

TO ALL WHOM IT MAY CONCERN:

Be it known that I, J. H. WILDER, of Farmington, in the county of Trumbull, and State of Ohio, have invented a new and useful Improvement in Horse Hay-Fork; and I do hereby declare that the following is a full, clear, and exact description thereof, which will enable those skilled in the art to make and use the same, reference being had to the accompanying drawings, forming part of this specification, in which—

Figure 1 is a side view of my improved hay-fork, shown in position with its load.

Figure 2 is a front view before taking its load.

Similar letters of reference indicate corresponding parts.

This invention relates to an improved construction of a horse hay-fork, and consists in making it without a handle, in a very compact form, for working through small hay-loft windows or doors, or in other places cramped for room, by connecting a swinging iron bail with a wooden head-piece, carrying a three-pronged fork, and so arranged that when the loaded fork is placed in position to deposit its load, it is tripped by a hand-rope connected with a latch that holds it till the load is raised; strength, simplicity, and durability in the construction being combined with great facility and effectiveness in the operation.

A represents a cross-head made of hard wood, about twenty-two inches long and three inches square, banded at each end, and having an upright post, B, formed of a band passing around the middle, and uniting above the upper side of the cross-head.

Three curved tines, C C C, are fastened to the cross-head A, projecting forward at right angles to the post B, with their concave sides upwards.

A bail, D, is attached to the ends of the cross-head A to swing back of and against the post B. The bail has a slotted head, a, terminating in a ring or loop, b, for receiving the hoisting-rope, and a latch, c, passes through the slot in the head a, to which it is pivoted so as to catch on the end of the post B, when the fork is raised with its load, being held fast in place by a spring, d, on the top, until it is tripped by means of a hand-rope, e, attached to the end of the spring.

Having described my invention, I claim as new, and desire to secure by Letters Patent—

The bail D, having slotted end a, in which the horizontal catch c is pivoted centrally, said catch notched at its forward end, and held engaged with the upper end of the post B, by the rearward-projecting spring attached to the rear end of the catch c, and released by the rope e, secured to the same end of the catch, and hanging downward through the head A, all constructed and arranged to operate as herein shown and described.

J. H. WILDER.

Witnesses:
WM. WILDMAN,
BENJAMIN LEW.